United States Patent
Tang et al.

(10) Patent No.: US 11,200,422 B2
(45) Date of Patent: Dec. 14, 2021

(54) METHOD AND SYSTEM FOR PIXEL CHANNEL IMBALANCE COMPENSATION FOR IMAGE SENSING CIRCUIT

(71) Applicant: REALTEK SEMICONDUCTOR CORP., Hsinchu (TW)

(72) Inventors: Wan-Ju Tang, Hsinchu (TW); Tsung-Hsuan Li, Hsinchu (TW); Shih-Tse Chen, Hsinchu (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 47 days.

(21) Appl. No.: 16/929,189

(22) Filed: Jul. 15, 2020

(65) Prior Publication Data
US 2021/0019530 A1    Jan. 21, 2021

(30) Foreign Application Priority Data

Jul. 17, 2019  (TW) ................................ 108125266

(51) Int. Cl.
*G06K 9/00*    (2006.01)
*G06K 9/62*    (2006.01)
(Continued)

(52) U.S. Cl.
CPC .......... *G06K 9/00711* (2013.01); *G06F 9/544* (2013.01); *G06K 9/40* (2013.01); *G06K 9/6202* (2013.01); *G06T 7/20* (2013.01)

(58) Field of Classification Search
CPC .... G06K 9/00711; G06K 9/40; G06K 9/6202; G06T 2207/10016; G06T 2207/20182;
(Continued)

(56) References Cited

U.S. PATENT DOCUMENTS 8,736,718 B2   5/2014  Chou et al.
9,313,467 B2   4/2016  Chen et al.
(Continued)

FOREIGN PATENT DOCUMENTS

CN    102769722 A    11/2012
TW    201026036 A    7/2010

OTHER PUBLICATIONS

Construction of Virtual Video Scene and Its Visualization During Sports Training (Year: 2020).*
(Continued)

*Primary Examiner* — Nizar N Sivji
(74) *Attorney, Agent, or Firm* — Li & Cai Intellectual Property (USA) Office

(57) ABSTRACT

A method and a system for pixel channel imbalance compensation for an image sensing circuit are provided. The system includes an image acquisition circuit having a lens, a color filter and an image sensor and a processing circuit. In the method performed by the processing circuit, a second frame image is retrieved from a motion image, and a first frame image that has undergone noise reduction can be retrieved from a memory. Motion detection is performed between the frames by comparing the first frame image and the second frame image. The motion detection is referred to as a reference for determining how to perform 3D noise reduction. A compensation value for channel imbalance between the adjacent channels can be estimated based on the image under noise reduction in a same buffer. While the pixel channel imbalance is compensated, the image is then restored by an interpolation method.

16 Claims, 5 Drawing Sheets

(51) Int. Cl.
*G06T 7/20* (2017.01)
*G06F 9/54* (2006.01)
*G06K 9/40* (2006.01)

(58) Field of Classification Search
CPC ........... G06T 7/20; G06T 7/254; G06T 5/002; G06T 5/50; G06F 9/544
See application file for complete search history.

(56) References Cited

U.S. PATENT DOCUMENTS

| | | | |
|---|---|---|---|
| 2003/0223644 A1* | 12/2003 | Park | H04N 19/51 382/236 |
| 2007/0071342 A1* | 3/2007 | Bilbrey | G06T 5/50 382/254 |
| 2008/0204572 A1 | 8/2008 | Oizumi | |
| 2008/0278631 A1* | 11/2008 | Fukuda | H04N 19/182 348/607 |
| 2011/0001884 A1* | 1/2011 | Iketani | H04N 5/145 348/699 |
| 2012/0212481 A1* | 8/2012 | Zipnick | G06T 5/50 345/419 |
| 2013/0100263 A1* | 4/2013 | Tsuda | G06T 7/136 348/65 |
| 2013/0293743 A1* | 11/2013 | Lee | H04N 5/23229 348/231.99 |
| 2016/0140696 A1* | 5/2016 | Yamada | G06T 5/10 382/167 |
| 2019/0213722 A1* | 7/2019 | Fujimoto | G06T 5/50 |

OTHER PUBLICATIONS

Wanqing Li, et al., "Modelling of color cross-talk in CMOS image sensors", Conference Paper in Acoustics, Speech, and Signal Processing, 1988. ICASSP-88., 1988 International Conference on Feb. 2002.

Chaminda Weerasinghe, et al., "Novel color processing architecture for digital cameras with CMOS image sensors." Nov. 2005, Research Online, University of Wollongong.

"Calibrating to Reduce Horizontal Line Artifact." Apr. 4, 2012, Technical Application Note TAN2012002.

* cited by examiner

| R | Gr | R | Gr | ... |
|---|----|---|----|----|
| Gb | B | Gb | B | ... |
| R | Gr | R | Gr | ... |
| Gb | B | Gb | B | ... |
| ⋮ | ⋮ | ⋮ | ⋮ | ⋱ |

FIG. 1

METHOD AND SYSTEM FOR PIXEL CHANNEL IMBALANCE COMPENSATION FOR IMAGE SENSING CIRCUIT

CROSS-REFERENCE TO RELATED PATENT APPLICATION

This application claims the benefit of priority to Taiwan Patent Application No. 108125266, filed on Jul. 17, 2019. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The disclosure is generally related to a method for imbalance compensation for pixel channels of an image-sensing circuit, and more particularly to a method that performs 3D noise reduction and imbalance compensation for pixel channels in an image-sensing circuit and a related circuit system.

BACKGROUND OF THE DISCLOSURE

For a single-chip CMOS image sensor adopting a Bayer Color Filter Array, each pixel of an image taken by the sensor only records a red, green or blue channel data. Thus, a full-color image can be restored from the image by an interpolation or demosaicing method.

When the image sensor with the color filter receives signals, an interactive influence among pixels may result in an influence, such as pixel cross-talk, with the result of the restoration using the interpolation method. For example, two pixels with green channels that originally receive the same signals may appear to have different green channel values due to various interactive influences caused by an adjacent red channel pixel or blue channel pixel.

When the interpolation method is used to restore the color image, a pixel channel imbalance is one of the issues to be considered in a digital image processing process. More specifically, referring to an example of the color filter shown in FIG. 1, the data recorded in the green channels are more than the other channels (e.g., red and blue channels) since every row of the color filter array has green channel information. Every green channel is adjacent to a red or blue channel, and therefore the red channel information of the green pixel can be represented by its adjacent red channel (i.e., Gr). The blue channel information of the pixel can be represented by the adjacent blue channel (i.e., Gb). Therefore, the green channel information of the image is referred to as an important reference and the interactive influences among the green channel information will result in an imbalance between the Gb and Gr pixel channels. The pixel channel imbalance requires further image processing in a field of digital image processing.

The interactive influences among the pixels are generally classified into three types that are described as follows. First, since a microlens is configured to be disposed on every pixel of the image sensor, a refraction phenomenon caused by an incident light of the pixel may affect signals received by adjacent pixels. These defects result in an optical crosstalk, e.g., the above-mentioned pixel cross-talk. Secondly, since penetration depths of the red, green and blue lights that are with different wavelengths for semiconductor materials are different, different degrees of influences occur due to various electron drifts. The influences result in electrical crosstalk. Thirdly, the layout of the circuits for the image sensor may also result in influences among the pixels, and the influences are referred to as architectural crosstalk.

Conventional measures used to reduce the imbalances among the green pixels that are adjacent to the blue and red pixels can be classified into three types as follows. First, a low-pass filtering method can be introduced to reduce inconsistencies of the green channels by averaging values of the green channels around the current green channel. However, the low-pass filtering method may result in loss of details of the image. Secondly, methods similar to the interpolation method can be performed on the pixel by referring to the values of the green channels around the current green channel. However, the methods similar to the interpolation method may not be able to adapt to all color filter arrays even though it may not result in loss of details so easily. Thirdly, a pre-correction method can be introduced for reducing horizontal line artifact. In the pre-correction method, a proportional adjustment can be used based on a linear relationship between the pixels for decreasing an imbalance caused by green pixels adjacent to blue and red pixels.

SUMMARY OF THE DISCLOSURE

The disclosure is related to a system and a method for pixel channel imbalance compensation applicable to an image-sensing circuit. A method for processing image noises such as 3D noise reduction is a method that will not damage details of an image. The 3D noise reduction includes a spatial noise reduction and a temporal noise reduction. The method is used to process an imbalance between Gb-Gr pixel channels. When applying the 3D noise reduction method, a compensation value for imbalance of pixel channel, e.g. the green channel, can be estimated by referring to the image data that has undergone noise reduction. The method can avoid error estimation of the compensation value for obtaining better result.

In one embodiment, the system for pixel channel imbalance compensation is implemented by a circuit system, e.g., Integrated Circuit (IC). The system is adapted to an image acquisition circuit that includes a lens, a color filter and an image sensor. The image acquisition circuit is used to receive a motion image. The system includes a memory that stores the motion images frame-by-frame, in which a first frame image that has undergone noise reduction is included. The system includes a processing circuit that performs a method for pixel channel imbalance compensation.

In the method, a second frame image can be retrieved from the motion image, and a first frame image is retrieved from the memory. The first frame image and the second frame image are temporarily stored into a buffer. Next, an image sensor is used to detect whether or not the image information of a pixel channel is found to have changed at the same position by comparing the first frame image with the second frame image so as to detect motion data in a preceding frame and a following frame of each pixel.

Next, a motion data of the pixel channel at the same position is referred to so as to decide on a noise reduction procedure for reducing noise while performing 3D noise reduction. The images that have undergone noise reduction in the same buffer are used for estimating a compensation value for channel imbalance between adjacent channels with the same pixel channel of the second frame image that has undergone noise reduction. The compensation value is used for compensating the pixel channels of the second frame image. After that, an interpolation is performed for restoring the second frame image.

Further, when it is determined that the pixel values at the same positions of the preceding and following frames of the motion images have not changed, a weight for noise reduction is set for the pixels at the same positions of the preceding and following frames, and the pixel values are configured to be combined according to a specific ratio for obtaining the output pixel values. Alternatively, when the pixel values of the preceding and following frames of the motion images are found to have changed, the output pixels values can be selected from the pixel values of the first frame image or the second frame image. In one further embodiment, the image information around the second frame image, i.e., the present frame, can be referred to as a reference for noise reduction, the reference is also provided for checking the variance of pixels at the same position in the first frame image and the second frame image. Further, the output pixel value can be decided by combining the pixel values of the first and second frame images. In an aspect, an additional searching step may be required for deciding the pixel values.

Further, in one embodiment of the disclosure, in the step of estimating the compensation value for the imbalance between same adjacent channels of the second frame image, a first compensation value for the imbalance between same adjacent channels of the first frame image and a second compensation value for the imbalance between same adjacent channels of the second frame image are obtained. A difference between the first frame image and the second frame image is referred to so as to decide on a reference ratio between the first compensation value and second compensation value. A compensation value is decided by referring to a combination of the first compensation value and the second compensation value according to a ratio.

BRIEF DESCRIPTION OF THE DRAWINGS

The present disclosure will become more fully understood from the following detailed description and accompanying drawings.

FIG. 1 is a schematic diagram of a conventional color filter used in an image sensor.

DETAILED DESCRIPTION OF THE EXEMPLARY EMBODIMENTS

Figure 2:
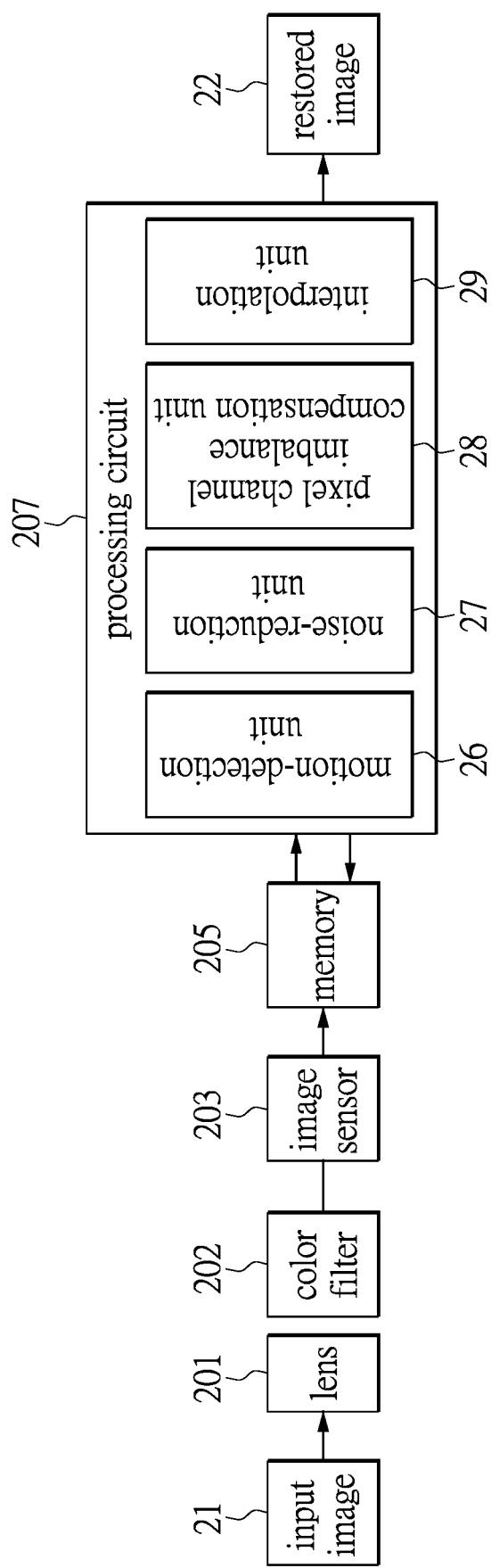
FIG. 2 is a circuit diagram depicting a system for pixel channel imbalance compensation used in an image-sensing circuit according to one embodiment of the disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Figure 1:
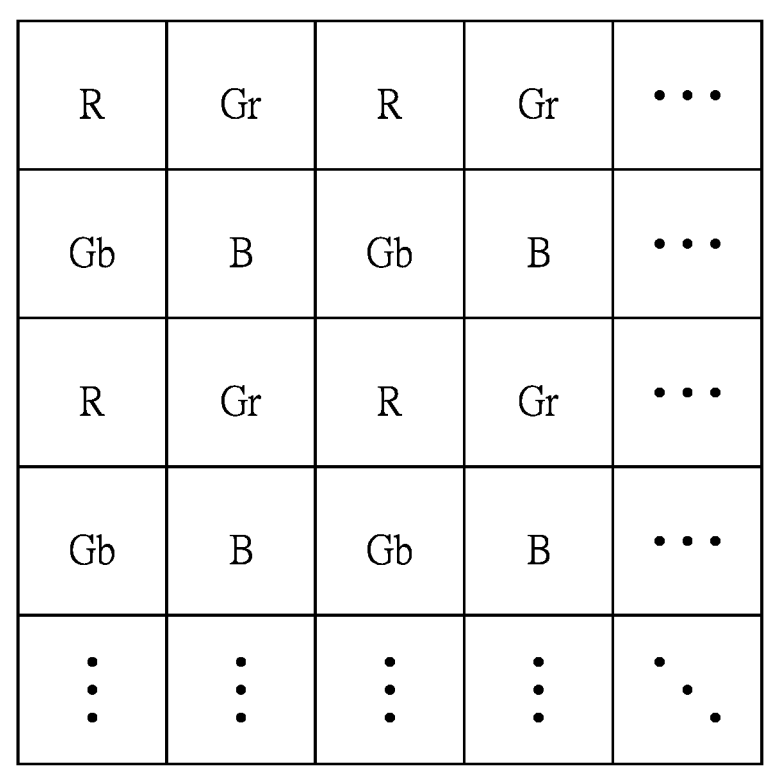

In an image-sensing circuit that uses a color filter, e.g., mosaic color filter array, the color filter can be referred to as shown in FIG. 1. The data amount of green channels is much more than that of red channels or blue channels. Every green channel is adjacent to a red channel or a blue channel. The green channel adjacent to the red channel can be represented as Gr. The green channel adjacent to the blue channel can be represented as Gb. However, the image value of Gr pixel channel should be the same with the image value of Gb pixel channel, but systematic problems such as the desire of image-sensing circuit may cause imbalance between the Gr and Gb pixel channels. On the other hand, the influence between the green channels also causes the imbalance between the pixel channels Gb and Gr, i.e., Gb-Gr imbalance. Various factors causing the Gb-Gr imbalance greatly affect upon the image-sensing circuit with the mosaic color filter when reproducing a color image. In view of the drawbacks, a method for pixel channel imbalance compensation applicable to an image-sensing circuit and its related circuits are provided in the disclosure.

While compensating the Gb-Gr imbalance, a photosensitivity that can be represented by an ISO value should be increased when the environment is dark. However, higher photosensitivity may cause more noises. Therefore, it is complicated to deal with the problem of Gb-Gr imbalance among the pixel channels. A 3D noise reduction method can be introduced to the method for pixel channel imbalance compensation. The 3D noise reduction method essentially includes processes of spatial noise reduction and temporal noise reduction. The method for pixel channel imbalance compensation applicable to the image-sensing circuit of the disclosure can be combined with the 3D noise reduction method. In an aspect of the disclosure, the image data that has passed the noise reduction is provided to the method for pixel channel imbalance compensation for estimating a compensation value for a green channel so as to avoid error compensation due to the noises. Therefore, an improved image can be obtained.

Reference is made to FIG. 2, which is a schematic diagram depicting a system for pixel channel imbalance compensation applicable to the image-sensing circuit according to one embodiment of the disclosure.

Figure 3:
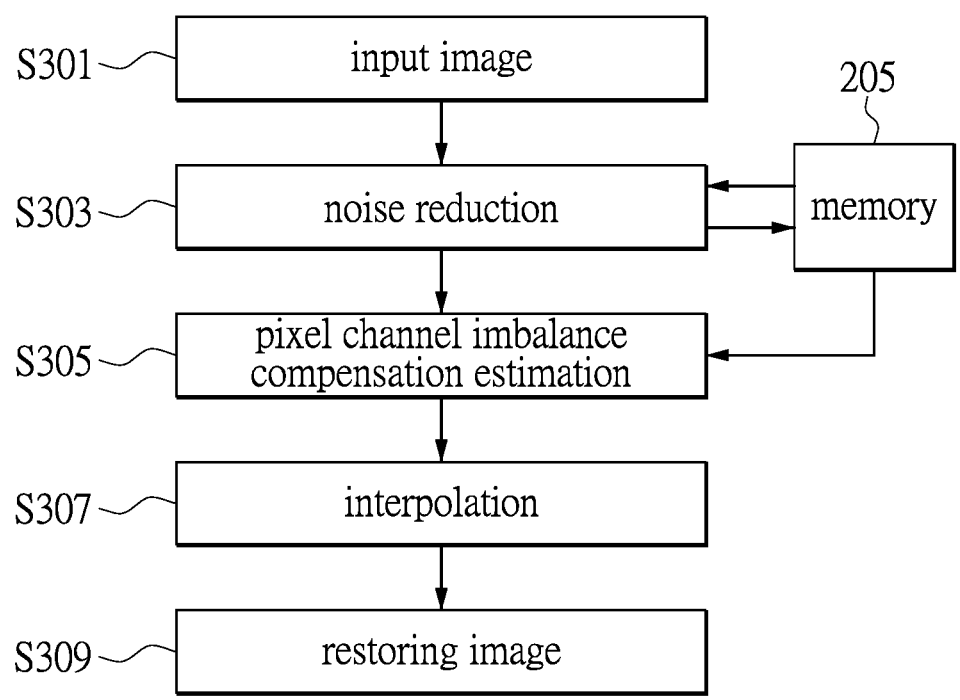
FIG. 3 shows a flow chart describing a method for pixel channel imbalance compensation in one embodiment of the disclosure.

The flow operating in the method can be referred to in the flow chart shown in FIG. 3. In the flow chart, the method for pixel channel imbalance compensation is described.

The system for pixel channel imbalance compensation is applicable to the image-sensing circuit. Main electronic components of the image-sensing circuit such as an image sensor processor (ISP) include an image acquisition circuit which includes a lens 201, a color filter 202 and an image sensor 203. The image acquisition circuit is used to receive motion images 21 (step S301). The motion images 21 are formed by a series of continuous frame images. The frame images are stored in a memory 205 (step S303). The memory 205 also stores images that have passed the noise reduction in the process of image processing. The image such as a first frame image is used as a reference for subsequent processes regarding noise reduction and pixel channel imbalance compensation.

The image-processing device may suffer from problems such as noises and image imbalance when producing an image. For example, the noises are greater when taking an image with high photosensitivity under a low-light environment. The noises are more obvious when a photosensitivity is higher. Taking a surveillance camera with high security requirement as an example, an image full of noises is not suitable for use in a surveillance system. Through a color filter, pixel values can be obtained from the image in the red, green and blue channels of the pixels. It should be noted that, since the pixel values cover long, middle and short bands of lights, image interference may occur because the lights may affect an optical component such as the lens 201 of the image-processing device. The mentioned interference causes cross-talk among the pixels when the pixels values are converted to digital signals.

Using a video as an example, the noises can be reduced by adjusting the pixel values and referring to the preceding and following frame images. For example, a combination of the data of two frame images may achieve the purpose of noise reduction. Further, a motion data of the pixels between the preceding frame and the following frame can be detected by comparing the channel values of the pixels at the same positon of the two frame images. The motion data can be referred to for the 3D noise reduction to reduce the noises. Therefore, noise reduction can be achieved. In other words, the changes of the pixels over time can be taken under consideration when the 3D noise reduction is performed.

The image-sensing circuit includes a processing circuit 207. The processing circuit 207 performs noise reduction and pixel channel imbalance compensation. In the processing circuit 207, some software and/or hardware-implemented components are included. The components include a motion-detection unit 26, a noise-reduction unit 27, a pixel channel imbalance compensation unit 28, and an interpolation unit 29. In the method for processing 3D noise reduction, a memory 30 stores the first frame image that has been processed with noise reduction in advance. The first frame image indicates a previous frame image in a video, or multiple frame images that have already been processed with noise reduction.

In step S303, the software and/or hardware-implemented noise-reduction unit 27 of the processing circuit 207 performs noise reduction. It should be noted that a basic noise-reduction process can be applied to the first frame if there is no previous frame image of the first frame. The basic noise-reduction process performs spatial noise reduction that may only consider the effect upon adjacent pixel values of a static image.

In one aspect of the method for pixel channel imbalance compensation, such as in step S301, a second frame image is retrieved from motion images and a first frame image can be retrieved from the memory 20 since the first frame image has been processed by noise reduction. When the second frame image is processed by noise reduction, the first frame image is taken into consideration. The first frame image can be the image that has been processed by noise reduction. The 3D noise reduction method requires a weight for noise reduction that is setting for the pixels with a difference at the same position in the preceding and following frames or of multiple frames. Based on the weight set for the pixels, the pixel values of the frame images are combined according to a specific ratio for obtaining the output pixel values. For example, an average of the pixel values of the preceding and following frames is used as an output pixel value, and then the output pixel values can conduct restoration of the second frame image. Therefore, the purpose of noise reduction can be achieved. Similarly, the second frame image that has been processed by noise reduction is stored in the memory 205 and the second frame image becomes a next reference image for a further noise reduction process performed onto a next frame.

According to one of the embodiments of the disclosure, the step of noise reduction can be incorporated with a process of motion detection. For example, the changes of the pixels at the same position of the frame images can be obtained by comparing the first frame image with the second frame image, or comparing the multiple preceding frame images and multiple following frame images. The changes are used to detect whether or not the pixels have any movement information. Specifically, the motion-detection unit 26 of the processing circuit 207 performs motion detection upon the present frame image (i.e., the second frame image), a previous frame image (i.e., the first frame image), or multiple frame images. The improved output pixel values are therefore obtained. The noise reduction for the images can also be implemented in the process.

Figure 4:
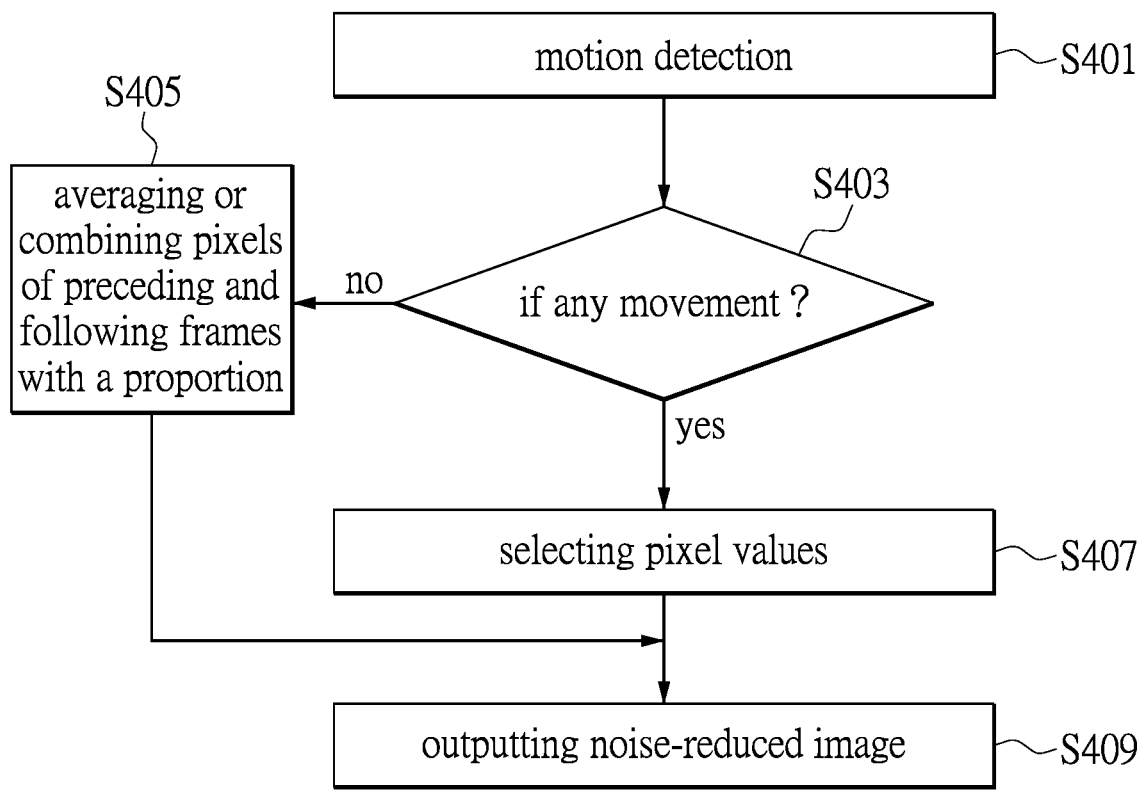
FIG. 4 shows a flow chart describing a process of noise reduction in one embodiment of the disclosure.

Reference is next made to FIG. 4, which shows a flow chart describing the method for pixel channel imbalance compensation according to one embodiment of the disclosure.

It is preferred that the frame images in the same buffer can be used for performing pixel channel imbalance compensation estimation (step S305). Further, for reducing pixel channel imbalance, a pixel channel imbalance compensation unit 28 of the processing circuit 207 can be used to estimate a compensation value for the imbalance of the adjacent pixel channels by software and/or hardware means. In an exemplary example, the compensation value is used to compensate Gb-Gr imbalance.

In the present step, before performing Gb-Gr pixel channel imbalance compensation upon the second frame image, in addition to the second frame image, the first frame image that that has been processed by noise reduction previously can be retrieved from the memory 205. Using the green channel as an example, the adjacent green channels always have the same or similar pixel values under the same light. However, the imbalance may occur among the adjacent channels due to various factors. Specifically, a green channel may be interfered by an adjacent red channel and blue channel. In the method, the second frame image can be referred to so as to determine the imbalance with respect to the green channel and the imbalance can accordingly be compensated. In one embodiment of the disclosure, a compensation value (i.e., first compensation value) between Gr channel and Gb channel can be estimated from the first frame image. In the meantime, another compensation value (i.e., second compensation value) can be estimated from the second frame image that has been processed by 3D noise reduction.

After a difference between the pixels in the first frame image and the second frame image is obtained by means of 3D noise reduction in step S303, a reference ratio between the first compensation value and the second compensation value can be decided. The reference ratio is provided for deciding the compensation value for the Gb and Gr pixel channels. For example, one of the first frame image and the second frame image is selected so as to obtain output pixel values. Further, an average of the frame images can also be used to obtain the output pixel values. Alternatively, a combination of the first compensation value and the second compensation value with a specific ratio can still be used to obtain the output pixel values.

It should be noted that the result of motion detection between the preceding and following frames of input motion images can be used to obtain a difference of pixels of the first frame image and the second frame image. The degree of movement of the motion images is referred to, to decide on a reference ratio between the two compensation values.

After that, when the compensation value is used to compensate the Gb-Gr pixel channel imbalance according to the reference ratio, an interpolation method is then applied to the image (step S307). The interpolation unit 29 of the processing circuit 207 is used to perform interpolation for restoring the image, e.g. a restored image 22 shown in the diagram (step S309).

The interpolation method is applicable to situations where the same pixel channels generated through a color filter in an image are discontinuous. The interpolation method is used to obtain the intermediate channel value from the adjacent channel values in which every two adjacent channels are arranged in an intermediate spacing. Therefore, the red, green and blue pixel values of each of the pixels are obtained.

The noise reduction has been performed on the frame images before the system performs the method for pixel channel imbalance compensation in an image-sensing circuit. The method allows the restored image to have better quality through noise reduction and pixel channel imbalance compensation.

One of the noise reduction methods can be referred to the flow chart shown in FIG. 4. The motion-detection unit 26 of the processing circuit 207 can be implemented by software and/or hardware for conducting motion detection. When frame images are retrieved from motion images received by an apparatus, the method for motion detection is performed on the pixels or the pixels within a specific range in each of the frames (step S401). Therefore, the motion information of each of the pixels in an image can be obtained. After that, a weighting concept can be introduced to set up weights (0 to 1) for the pixels according to degrees of movements. Moreover, the weights are configured to adjust the ratio for combining the pixel values of the preceding and following frames. In step S403, the process of motion detection determines whether or not the movement is found among the pixels. If there is no movement or the movement is smaller than a preset threshold, it is determined that there is no movement among the pixels, and the pixel values at the same position of the first frame image and the second frame image or more frame images are used as the output pixel values. As described above, the output pixel values can be the pixel values combined of the data from two or more frame images according to a specific ratio, or an average of the pixel values thereof (step S405) so as to achieve the purpose of noise reduction.

In step S403, when it is determined that there is movement among the pixels, it means it is inappropriate to combine the first frame image and the second frame image to reduce the noises, but the output pixel values can be the pixel values at the same position selected from any of the first frame image and the second frame image (step S407).

It should be noted that, since the pixels of the first frame image have been processed by noise reduction, the pixel values of the first frame image can preferably be used as the output pixel values for the purpose of noise reduction. The information around the present frame, i.e., the second frame image, can still be the reference for noise reduction. For example, the information around the present frame can be combined with the variance of the pixels of the first frame image so as to decide the output pixel values, however, this aspect may require an additional searching step. In one further embodiment of the disclosure, if the pixels between the frame images are found to have movement, a processing circuit (e.g., the noise-reduction unit 27 of processing circuit 207 of FIG. 2) can determine preferred pixel values from the preceding and following frame images by determining a moving object in the frames.

When the whole frame image has undergone the noise reduction, a final frame image is outputted (step S409) and stored in a memory. The output frame image becomes a reference image for a next frame image to conduct noise reduction. Therefore, every output from the process of noise reduction can affect the follow-up image-processing process.

Figure 5:
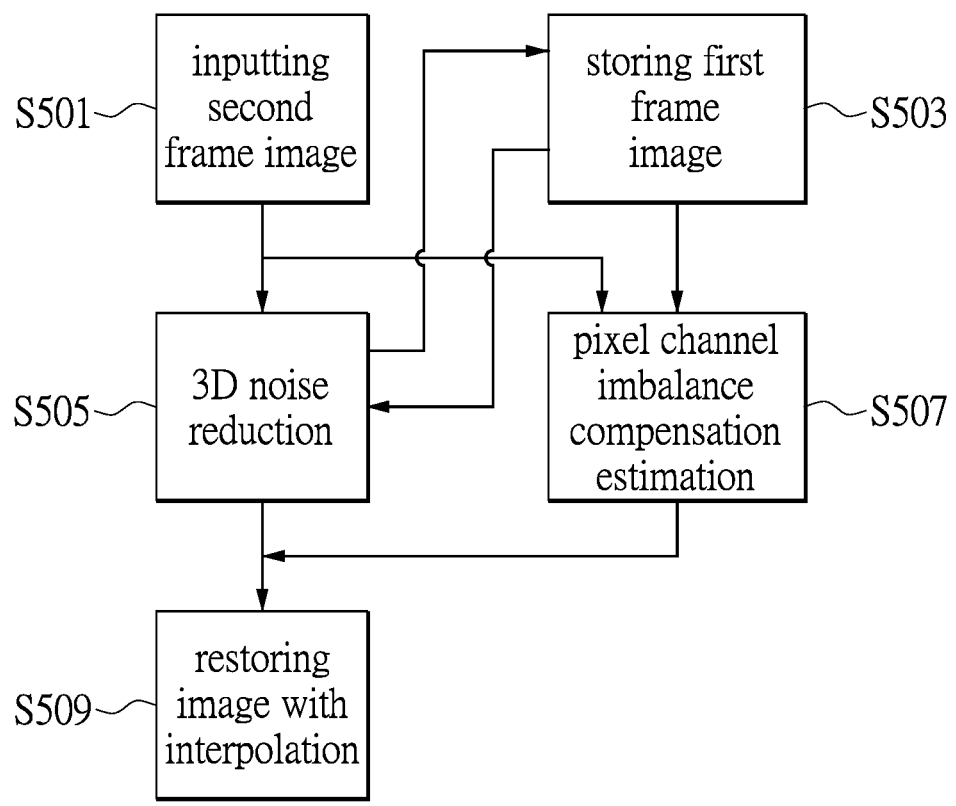
FIG. 5 shows another flow chart describing pixel channel imbalance compensation in one further embodiment of the disclosure.

In one further embodiment of the disclosure, reference is made to FIG. 5 which shows a flow chart of the method for pixel channel imbalance compensation.

Different from the process described in FIG. 3, the flow chart in FIG. 5 describes a process of 3D noise reduction and a compensation that is performed for the pixel channel imbalance. Both the process of noise reduction and the steps for compensating pixel channel imbalance retrieve the image data such as the first frame image and the second frame image from the same buffer. This aspect allows the system to adopt a smaller image buffer such as a line buffer since it saves the space for buffering a whole image. When the system performs the process of noise reduction and then the method for imbalance compensation, a difference of the second frame image will appear before and after the noise reduction process.

In FIG. 5, the system firstly receives motion images that include a series of continuous frame images. The first frame image indicates the one or more images that have undergone noise reduction previously. The first frame image is stored in a memory of the system (step S503). A second frame image is then inputted (step S501).

In step S505, the process of noise reduction is performed on the second frame image. In the process, not only a spatial noise reduction is performed, but the 3D noise reduction method that considers the changes of image over time is also performed on the image.

In the process of 3D noise reduction, the first frame image is retrieved from the memory. The first frame image can be firstly buffered in an image buffer of the processing circuit. Through a method of motion detection, the changes of pixels between the first frame image that has been processed by noise reduction and the second frame image are obtained.

The system then determines a degree of difference between the pixels at the same position in the preceding and following frame images. The system can therefore perform 3D noise reduction according to the degree of difference between the pixels of the preceding and following frame images.

In one embodiment of the disclosure, the difference of the pixels at the same position in the preceding and following frame images can be obtained for determining if any change occurs. A motion detection process is implemented by this step. The degree of movement affects the follow-up compensation for the Gb-Gr pixel channel imbalance. In view of FIG. 4, if it is determined that no change occurred in the preceding and following frames, the pixel values of the first frame image can be used as the output pixel values. Otherwise, if it is found that changes have occurred between the preceding and following frames, the difference is detected and used as reference for further step of noise reduction. Therefore, the output pixel values can be the pixel values selected from the preceding frame image or the following frame image, or the output pixel values can be an average of the pixel values of the preceding and following frames, or a combination of the pixel values with a specific ratio. The purpose of noise reduction is therefore achieved.

In one further embodiment, when selecting the pixel values, the information around the second frame image, i.e., the present frame, can be used as a reference for noise reduction. The changes at the same position of the first and the second frame images can also be referred to so as to combine the pixel values of the first frame image and the second frame image.

In step S507, a compensation value for Gb-Gr pixel channel imbalance can be obtained from the second frame image stored in the same buffer. Such as in step S305 of FIG. 3, one of the objectives of the step is to balance the Gr and Gb pixel values for performing noise reduction on the second frame image. The pixel channel imbalance compensation estimation can improve the accuracy of compensation.

At last, in step S509, an interpolation method is introduced to restore the red, green and blue values for each of the pixels.

It should be noted that, in the embodiment shown in FIG. 5, a process of noise reduction and another process of imbalance compensation can be performed simultaneously. Only the first frame image is the image that has been processed by noise reduction and stored in the buffer in advance. When the imbalance compensation for the second frame image is estimated, the second frame image retrieved by the two processes is still the original image that has not been processed by noise reduction. Therefore, when it is determined that no change of the pixel at the same position is found, the process for compensation estimation only refers to the first frame image for calculating a first compensation value. However, if it is determined that a change is found in the pixel at the same position in the first and second frame images, a second compensation value will be estimated and used as the compensation value for the follow-up process of noise reduction. It should be noted that this second compensation value is still appropriate for the process of noise reduction because the information around the second frame image is still under consideration even if the second frame image has not undergone the noise reduction; further, the mentioned second compensation value is appropriate and good for a surveillance system because the static scenes are generally more than the dynamic scenes in the surveillance pictures.

In summary, the method for pixel channel imbalance compensation and the circuit system are applicable to an image-sensing circuit. One of the objectives of the method is to solve the problem of imbalance among the images since they are generated through a color filter. For example, the Gr-Gb pixel channel imbalance can be reduced by the method of the disclosure. Further, the camera used in a surveillance system may always be operated under low light environment at night. The Gb-Gr pixel channel imbalance compensation can be combined with the process of 3D noise reduction for the purpose of taking the data that has been processed by noise reduction into consideration so as to estimate the compensation value. Therefore, a better result can be obtained since it effectively avoids an erroneous compensation value affected by the noise among the pixels.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A system, comprising:
    a memory configured to store motion images frame-by-frame, and a first frame image with noise reduction; and
    a processing circuit configured to perform steps including:
        retrieving a second frame image from the motion image, and the first frame image of the motion images from the memory, and buffering the first frame image and the second frame image into a buffer;
        sensing whether or not image information of pixel channel at the same position changes by comparing the first frame image with the second frame image so as to detect motion data of each pixel in a preceding frame and a following frame;
        deciding on a noise reduction procedure for reducing noises while performing 3D noise reduction based on the motion data of pixel channels at the same position;
        estimating a compensation value for an imbalance between adjacent channels with the same pixel channel of the second frame image that has undergone the noise reduction procedure and compensating the pixel channels of the second frame image; and
        performing an interpolation for restoring the second frame image.

2. The system according to claim 1, wherein the first frame image and the second frame image are the preceding and following frames of the motion image, and one or more frame images have been processed with noise reduction before the second frame image is stored in a memory.

3. The system according to claim 2, wherein image information around the second frame image is taken as reference for noise reduction, and the reference is further provided for checking a variance of the pixel at the same position in the first frame image and the second frame image, a value of the pixel being decided by combining pixel values of the first frame image and the second frame image.

4. The system according to claim 2, wherein, when pixel values of the preceding and following frames of the motion images at the same position have not changed, a weight for noise reduction is set for the pixels of the preceding and following frames at the same position, and the pixel values are combined according to a specific ratio and referred to as output pixel values; otherwise, when the pixel values of the preceding and following frames of the motion images at the same position are found to have changed, the output pixel values are decided from the pixel values selected from the first or second frame images at the same position.

5. The system according to claim 4, wherein, when the pixel values of the preceding and following frames of the motion images at the same position are found to have changed, the pixel values of the first frame image are selected as the output pixel values.

6. The system according to claim 5, wherein the step of estimating the compensation value for the imbalance between same adjacent channels in the second frame image that has undergone noise reduction includes:
   estimating a first compensation value for the imbalance between same adjacent channels in the first frame image;
   estimating a second compensation value for the imbalance between same adjacent channels in the second frame image;
   deciding on a reference ratio of the first compensation value and the second compensation value according to a difference between the first frame image and the second frame image; and
   combining the first compensation value and the second compensation value according to the reference ratio so as to decide the compensation value.

7. The system according to claim 1, wherein, when estimating the compensation value for the imbalance between same adjacent channels, the frame images are retrieved from the buffer.

8. The system according to claim 7, wherein, in the step of performing noise reduction and compensating for the imbalance between same adjacent channels, the first frame image and the second frame image are retrieved from the same buffer.

9. A method comprising:
   retrieving a second frame image from a motion image, and a noise-reduced first frame image of the motion images from a memory, and buffering the first frame image and the second frame image into a buffer;
   sensing, by an image sensor, whether or not image information of a pixel channel at the same position changes by comparing the first frame image with the second frame image so as to detect motion data in a preceding frame and a following frame of each pixel;
   deciding on a noise reduction procedure for reducing noises while performing 3D noise reduction based on the motion data of pixel channels at the same position;
   estimating a compensation value for an imbalance between adjacent channels with the same pixel channel of the second frame image that has undergone the noise reduction procedure and compensating the pixel channels of the second frame image; and
   performing an interpolation for restoring the second frame image.

10. The method according to claim 9, wherein, in addition image information around the second frame image regarded as reference for noise reduction, the reference is provided for checking a variance of the pixel at the same position in the first frame image, and therefore output pixel values are decided by combining pixel values of the first frame image and the second frame image.

11. The method according to claim 9, wherein, when pixel values of the preceding and following frames of the motion images at the same position have not changed, a weight for noise reduction is set for the pixels of the preceding and following frames at the same position, and the pixel values are combined according to a specific ratio and referred to as output pixel values; otherwise, when the pixel values of the preceding and following frames of the motion images at the same position are found to have changed, the output pixel values are decided from the pixel values selected from the first or second frame images at the same position.

12. The method according to claim 11, wherein, when the pixel values of the preceding and following frames of the motion images at the same position are found to have changed, the pixel values of the first frame image are selected as the output pixel values.

13. The method according to claim 12, wherein the step of estimating the compensation value for imbalance between adjacent the same channels in the second frame image that has undergone noise reduction includes:
   estimating a first compensation value for the imbalance between same adjacent channels in the first frame image;
   estimating a second compensation value for the imbalance between same adjacent channels in the second frame image;
   deciding on a reference ratio of the first compensation value and the second compensation value according to a difference between the first frame image and the second frame image; and
   combining the first compensation value and the second compensation value according to the reference ratio so as to decide the compensation value.

14. The method according to claim 9, wherein, when estimating the compensation value for the imbalance between same adjacent channels, the frame images are retrieved from the buffer.

15. The method according to claim 14, wherein the imbalance between same adjacent channels is an imbalance between Gb and Gr pixel channels in each frame image sensed by the image sensor, wherein Gr indicates a green channel next to a red channel, and Gb indicates a green channel next to a blue channel.

16. The method according to claim 15, wherein, in the step of performing noise reduction procedure and compensating for the imbalance between same adjacent channels, the first frame image and the second frame image are retrieved from the same buffer.

* * * * *